3,749,708
Patented July 31, 1973

3,749,708
WATER-SOLUBLE BASIC HETEROCYCLIC AZO AMINONAPHTHYL DYESTUFFS CONTAINING A QUATERNARY AMMONIUM ALKANOYL SUBSTITUENT
Gert Hegar, Schoenenbuch, Switzerland, assignor to Ciba-Geigy AG, Basel, Switzerland
No Drawing. Continuation-in-part of application Ser. No. 605,609, Dec. 29, 1966. This application Mar. 24, 1971, Ser. No. 127,769
Int. Cl. C09b 29/06; D06p 3/76
U.S. Cl. 260—156        2 Claims

ABSTRACT OF THE DISCLOSURE

Water-soluble basic azo-dyestuffs containing an ammonium-alkanoyl radical bound to an aminonaphthalene coupling component and having the formula

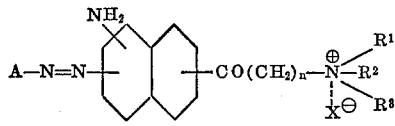

The compounds are suitable for dyeing polyacrylonitrile and polyvinylidene cyanide, the fibers so dyed having very good fastness to light.

CROSS-REFERENCE TO OTHER APPLICATIONS

This application is a continuation-in-part of application Ser. No. 605,609, filed Dec. 29, 1966, now issued to U.S. Pat. 3,631,164 on Dec. 28, 1971.

The present invention provides water-soluble basic azo dyestuffs free from acidic groups imparting solubility in water, especially sulphonic acid or carboxylic acid groups, which correspond to the formula $$A—N=N—B$$

in which A represents the residue of a diazotized heterocyclic amine and B represents the residue of a coupling component derived from an aminonaphthalene containing a group of the formula

attached to the naphthalene nucleus, in which formula "alk" represents an alkylene group, $R_1$, $R_2$ and $R_3$ each represent an alkyl, aralkyl or cycloalkyl radical, and $R_1$, $R_2$ and $R_3$ may, together with the nitrogen atom, form a heterocyclic ring, and X represents an anion.

The invention also provides a process for the manufacture of water-soluble basic azo dyestuffs of the above formula, wherein (a) a diazotized heterocyclic amine is coupled with a coupling component being an aminonaphthalene containing a group of the formula

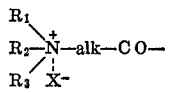

attached to the naphthalene nucleus, in which formula $R_1$, $R_2$, $R_3$ and X have the meanings given above, or (b) an azo dyestuff, the coupling component of which is derived from an aminonaphthalene containing a halogenated acyl group attached to the naphthalene nucleus, is reacted with a tertiary amine of the formula

or (c) an azo dyestuff in which the residue of the coupling component is derived from an aminonaphthalene containing a group of the formula

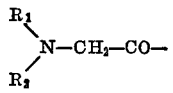

is treated with a quaternating agent.

The amino group in the aminonaphthalenes to be used in method (a) may be substituted, for example, by one or two alkyl groups or a phenyl group. The aminonaphthalenes preferably correspond to the formula

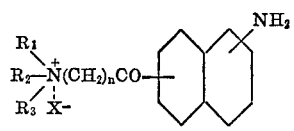

in which $R_1$, $R_2$ and $R_3$ have the meanings given above and $n$ stands for 1 or 2. These compounds are obtainable by condensing an acylated or dialkylated aminonaphthalene with chloracetyl chloride or chloropropionyl chloride in the presence of aluminium chloride, reacting the chloracetyl compound so obtained with the appropriate tertiary amine and, if necessary, splitting off the N-acyl group. The following starting materials may be mentioned as examples:—

1-acetylaminonaphthalene,
2-acetylaminonaphthalene,
N-acetyl-1-ethylaminonaphthalene,
N-acetyl-1-methylaminonaphthalene,
N-acetyl-1-phenylaminonaphthalene,
N-acetyl-2-ethylaminonaphthalene,
N-acetyl-2-phenylaminonaphthalene and
2-diethylaminonaphthalene.

Suitable heterocyclic diazo components are, for example, 2-aminothiazole, preferably 2-amino-5-nitrothiazole, or especially 2-amino-benzthiazoles, for example, 2-aminothiazole,
2-amino-5-nitrothiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
2-aminobenzthiazole,
2-amino-6-methylbenzthiazole,
2-amino-6-methoxybenzthiazole,
2-amino-6-chlorobenzthiazole,
2-amino-6-nitrobenzthiazole, and also
2-amino-1,3,4-thiadiazole,
2-amino-1,3,5-thiadiazole and
2-amino-4-phenyl-1,3,5-thiadiazole.

Diazotization of the above-mentioned diazo components may be effected by known methods, for example, with the aid of a mineral acid, especially hydrochloric acid, and sodium nitrate.

Coupling may likewise be carried out in known manner, for example, in an acid to alkaline medium, if necessary, in the presence of sodium acetate or some similar buffer or catalyst which influences the rate of coupling, for example, pyridine, or the salts thereof.

In method (b) of the present process a dyestuff containing a halogenated acyl group is reacted with a tertiary amine, for example, trimethylamine, triethylamine, triethanolamine, dimethylcyclohexylamine, N-methylpiperidine or pyridine, advantageously by heating in an excess of the amine in the presence or absence of a solvent. The dyestuff containing a halogenated acyl group is advantageously obtained by coupling a diazotized heterocyclic amine with an aminonaphthalene containing a halogenated acyl group attached to the naphthalene nucleus.

The starting material used in method (c) of the present process is a dyestuff in which preferably $R_1$ and $R_2$ are alkyl radicals. This is treated with an alkylating agent, advantageously with an alkyl or aralkyl halide or an alkyl or aralkyl ester of sulphuric acid or an organic sulphonic acid. Examples of alkylating agents are methyl chloride, methyl bromide, methyl iodide, benzyl chloride, trimethyloxonium boron fluoride, dimethyl sulphate, diethyl sulphate, benzenesulphonic acid methyl ester and paratoluene-sulphonic acid ethyl or butyl ester. Alkylation is advantageously carried out by heating in an inert organic solvent, for example, a hydrocarbon, for example, carbon tetrachloride, tetrachloroethane, chlorobenzene, ortho-dichlorobenzene, or nitro-hydrocarbons, for example, nitromethane, nitrobenzene or nitronaphthalene. It is also possible to use acid anhydrides, acid amides or nitriles, for example, acetic anhydride, dimethylformamide or acetonitrile, or also dimethylsulphoxide. Use can also be made of an excess of alkylating agent instead of an inert solvent. In this case, care must be taken to ensure that the mixture does not heat up excessively, because the reaction is highly exothermic. In most cases, however, especially in the presence of an organic solvent, it is necessary to apply external heat to the reaction mixture in order to initiate the reaction. In special cases, alkylation may also be performed in an aqueous medium or with the use of an alcohol, possibly in the presence of a small amount of potassium iodide.

Purification of the dyestuff salts is advantageously effected by dissolving them in water; any unreacted dyestuff used as starting material can then be removed as insoluble matter by filtration. The dyestuff can be precipitated from the aqueous solution by the addition of a water-soluble salt, for example, sodium chloride.

The dyestuffs obtainable by the process of the invention preferably contain as anion the residue of a strong acid, for example, sulphuric acid, or the semi-esters thereof, or the residue of an arylsulphonic acid, or a halogen ion. The above-mentioned anions introduced into the dyestuff molecule in accordance with the invention may also be replaced by anions of other inorganic acids, for example, by anions of phosphoric acid or sulphuric acid, or by anions of organic acids, for example, those of formic acid, acetic acid, chloracetic acid, oxalic acid, lactic acid or tartaric acid; it is also possible to use the free bases in certain cases. The dyestuff salts may also be in the form of double salts, for example, with halides of elements of Group II of the Periodic Table, especially zinc or cadmium chloride.

The dyestuff salts obtained by the process of the invention are suitable for dyeing and printing a very wide variety of materials, for example, tannin-treated cellulosic fibres, silk, hair, leather, and also fully synthetic fibres, especially polyacrylonitrile and polyvinylidene cyanide (Darvan). Dyeings produced on these fibers are distinguished by a very good fastness to light. The dyestuffs are also capable of ensuring good reservation of wool, which makes them specially suitable for the dyeing of anion fabrics made from wool and polyacrylonitrile fibre. Also worthy of mention is the fact that the dyeings obtained display a good fastness to carbonizing.

The present invention also includes the starting materials containing a ternary nitrogen atom corresponding to the quaternated dyestuffs prepared in accordance with method (c) and which are primarily suitable for use as disperse dyestuffs in the dyeing of cellulose acetate fibres, and especially fully synthetic polyester fibres, for example, polyethylene terephthalate fibres.

The following examples illustrate the invention. Unless otherwise stated, the parts and percentages are by weight.

Example 2.34 parts of 2-amino-3-nitrothiazole are dissolved in 50 parts of sulfuric acid containing 2.6 parts of nitrogen hydrogen sulphate. When diazotization is complete the so-obtained diazo compound is added dropwise to a solution of 5.74 parts of 2-amino-6- and 8-[α-(N-chloropyridino)-acetyl]-naphthalene in 200 parts of water and 100 parts of ice. The mixture is rendered neutral to Congo paper by the addition of sodium acetate and the dyestuff is precipitated by the addition of sodium chloride. The dyestuff yields blue dyeings possessing good properties of fastness on polyacrylonitrile fibres.

If, instead of the pyridininum compound an equivalent amount of a mixture of 2-amino-6- and 8-[α-(N-chlorotrimethylamino)-acetyl]-naphthalene is used, a blue dyestuff with similar properties is obtained.

By using the coupling components indicated in column II of the table below instead of 2-amino-5-nitrothiazole, basic dyestuffs are obtained which dye polyacrylonitrile the tins listed in column III.

| I | II Coupling component | III Tint |
|---|---|---|
| 1 | 2-amino-5-cyanothiazole | Reddish blue. |
| 2 | 3-amino-1,3,4-triazole | Orange. |
| 3 | 2-amino-6-methylbenzthiazole | Claret. |
| 4 | 2-amino-6-ethoxybenzthiazole | Do. |
| 5 | 2-chloro-6-nitrobenzthiazole | Violet. |
| 6 | 2-amino-5-phenyl-1,3,4-thiadiazole | Red. |
| 7 | 5-amino-3-phenyl-1,2,4-thiadiazole | Red. |
| 8 | 2-amino-4-phenylthiazole | Orange. |
| 9 | 3-aminoquinoline | Reddish yellow. |
| 10 | 3-amino-5-nitroindazole | Brown. |
| 11 | 2-amino-6-cyanobenzthiazole | Claret. |

Dyeing prescription: 1 part of the dyestuff obtained in the manner described in the first paragraph of the example is dissolved in 5,000 parts of water in the presence of 2 parts of acetic acid of 40% strength. 100 parts of dried polyacrylonitrile staple fibre yarn are entered into the dyebath so prepared at 60° C., the temperature is raised to 100° C. in the course of 30 minutes, and dyeing is carried out for one hour at the boil. The yarn is then well rinsed and dried. A blue dyeing possessing a very good fastness to light, to sublimation and to washing is obtained.

What is claimed is:
1. An azo-dyestuff of the formula

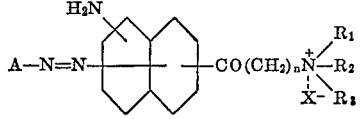

in which $R_1$ and R each represents a member selected from the group consisting of lower alkyl, hydroxy-lower alkyl, phenyl-lower alkyl and cyclo-lower alkyl, $R_3$ represents lower alkyl or hydroxy-lower alkyl; $R_1$ and $R_2$ taken together with the nitrogen atom represent a member selected from the group consisting of an unsubstituted or lower alkyl-substituted piperidine, morpholine or pyrrolidine ring and $R_1$, $R_2$ and $R_3$ taken together with the nitrogen atom represent an unsubstituted or lower-alkyl-substituted pyridinium ring, X represents an anion, $n$ is 1 or 2 and A represents a cyclic diazo component bound to the azo-group via a carbon atom and selected from the group consisting of 5-nitro-thiazolyl-2, 5-cyanothiazolyl-2, 1,2,4-triazolyl-3, benzthiazolyl-2, 6-lower alkylbenzthiazolyl-2, 6-lower alkoxybenzthiazolyl-2, 6-carbo-lower alkoxy-benzthiazolyl-2, 6-chlorobenzthiazolyl-2, 6-lower alkyl-sulfonylbenzthiazolyl-2, 6-nitrobenzthiazolyl-2, 1,3,4-thiazolyl-2, 5-phenyl-1,3,4-thiadiazolyl-2, 5-lower alkyl-1,3,4-thiadiazolyl-2, 1,3,4-thiadiazolyl-2, 4-phenyl-1,3,5-thiadiazolyl-2, 4-lower alkyl-1,3,5-thiadiazolyl-2, 4-lower alkyl-5-nitrothiazolyl-2, 4-lower alkylthiazolyl-2, 4-phenyl-thiazolyl-2, quinolinyl-3, pyrazolyl-3, 1-phenyl-pyrazolyl-3, indazolyl-3, 1-(4'-lower alkoxyphenyl)-pyrazolyl-3, 6-cyano-benzthiazolyl-2 and 1,3,4-thiadiazolyl-2.

2. The azo-dyestuff as claimed in claim 1 of the formula
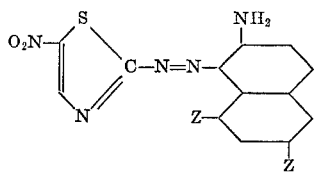
wherein one Z is hydrogen and the other Z is
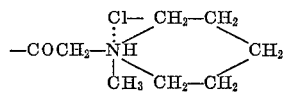
References Cited
UNITED STATES PATENTS
| | | | |
|---|---|---|---|
| 2,206,099 | 7/1940 | McNally et al. | 260—205 |
| 3,117,960 | 1/1964 | Illy | 260—156 |
| 3,119,810 | 1/1964 | Sartori | 260—163 |
| 3,148,181 | 9/1964 | Wallace et al. | 260—158 X |
| 3,532,683 | 10/1970 | Sartori | 260—207 |
FLOYD D. HIGEL, Primary Examiner
U.S. Cl. X.R.
8—41 A; 117—138.8 R; 260—152, 155, 157, 158, 162